No. 701,331. Patented June 3, 1902.
J. GRIFFIN.
MILK PAIL.
(Application filed Mar. 18, 1902.)
(No Model.) 2 Sheets—Sheet 1.

Witnesses
G. H. Walmsley
J. B. Wilson

Inventor
J. Griffin,
By H. B. Willson & Co.
Attorneys

No. 701,331. Patented June 3, 1902.
J. GRIFFIN.
MILK PAIL.
(Application filed Mar. 18, 1902.)
(No Model.)
2 Sheets—Sheet 2.
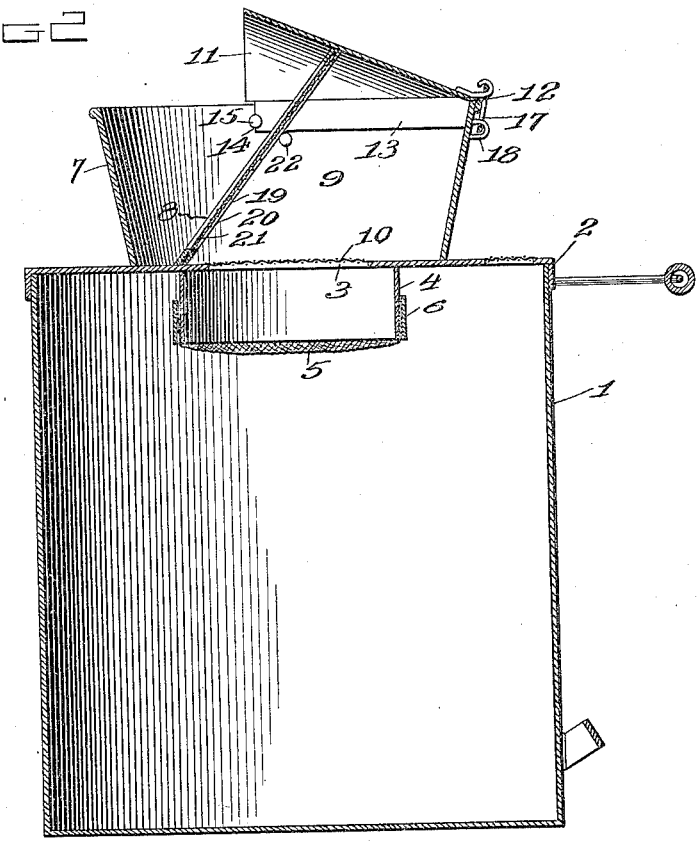
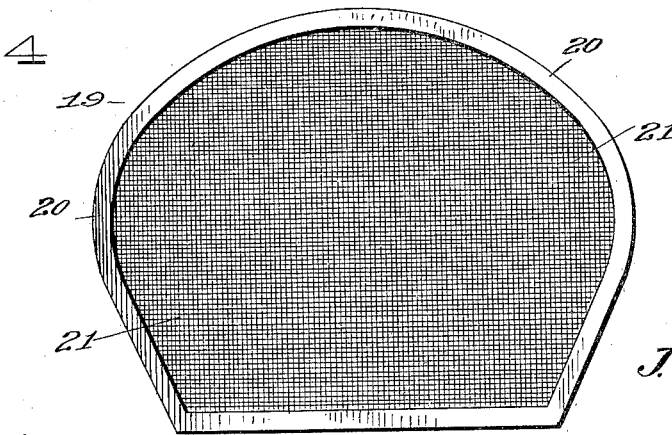
Inventor
J. Griffin,
Witnesses
By H. B. Willson & Co.
Attorneys

UNITED STATES PATENT OFFICE.

JOHN GRIFFIN, OF SCOTTVILLE, MICHIGAN.

MILK-PAIL.

SPECIFICATION forming part of Letters Patent No. 701,331, dated June 3, 1902.

Application filed March 18, 1902. Serial No. 98,796. (No model.)

*To all whom it may concern:*

Be it known that I, JOHN GRIFFIN, a citizen of the United States, residing at Scottville, in the county of Mason and State of Michigan, have invented certain new and useful Improvements in Milk-Pails; and I do declare the following to be a full, clear, and exact description of the invention, such as will enable others skilled in the art to which it appertains to make and use the same.

The invention relates to milk-pails.

The object of the invention is to provide a pail of this character which shall be simple of construction, durable in use, comparatively inexpensive of production, and by the employment of which the milk as it leaves the cow will be effectually strained and aerated and the tendency of its splashing upon the milker reduced to a minimum, provision being made whereby foreign matter—such as dirt or the dripping of rain from the sides of the animal or the udder—will be prevented from falling into the pail.

With this and other objects in view the invention consists of certain novel features of construction, combination, and arrangement of parts, which will be hereinafter more fully described, and particularly pointed out in the appended claim.

Figure 1:
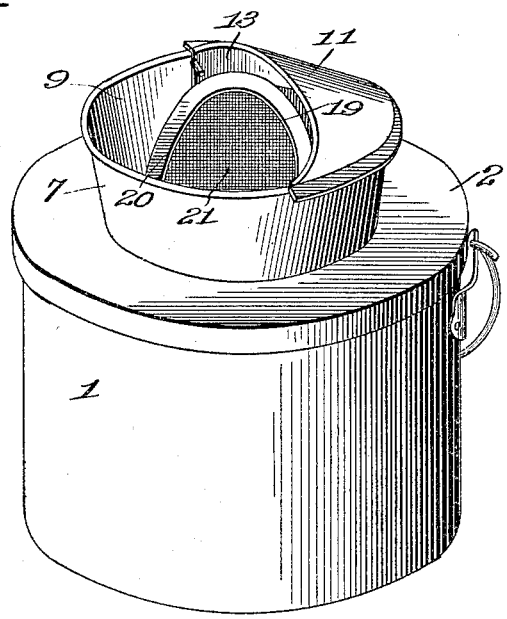
Figure 3:
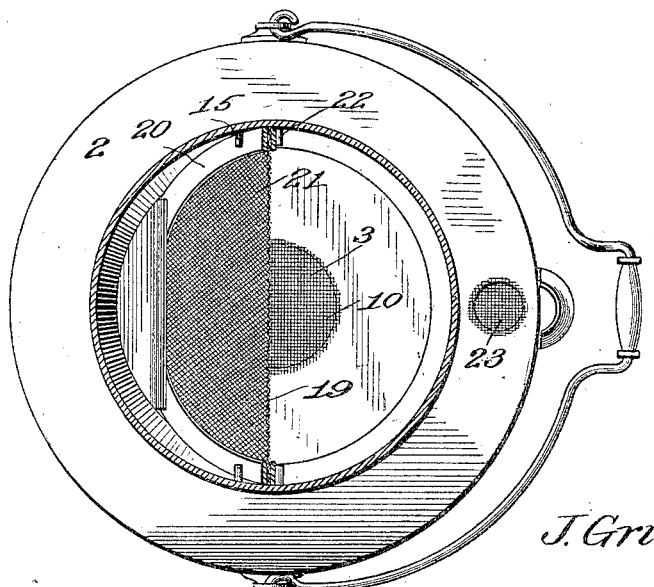

In the accompanying drawings, Figure 1 is a perspective view of my improved milk-pail. Fig. 2 is a vertical longitudinal sectional view taken through the top or cover of the pail. Fig. 3 is a view taken at right angles to Fig. 2, and Fig. 4 is a detail view of the inclined strainer.

Referring to the drawings, 1 denotes the body of the pail, which may be of any well-known or approved shape or construction, and 2 denotes the flanged top or cover to close the upper end of the pail. The top is provided with a central aperture 3, around which is formed an annular downwardly-projecting collar 4, to which is adapted to be clamped a flexible strainer 5 by a clamping ring or band 6. The upper side of the cover is provided with a neck portion 7, having a partition 8 to form a trap or basin 9.

10 denotes a fine-wire strainer secured over the central opening in the top of the cover above the strainer 5 and flush with the upper surface of the pail top or cover.

11 denotes a shield, which has a laterally-projecting flange 12, which rests upon a portion of the rim of the neck and is provided with a downwardly-extending flange 13, which engages the inner wall of a portion of the neck. This shield is adapted to cover a portion of the neck and in the act of milking prevents foreign matter from dropping from the cow into the milk which enters the neck of the top, and also serves to prevent the splashing of the milk upon the milker. This shield is provided with notches 14, which are adapted to engage studs 15, projecting inwardly from the sides of the neck at diametrically opposite points, and is provided with a hook 17, which is adapted to engage a staple 18, secured to the neck, whereby the shield is firmly yet removably connected to the neck.

19 denotes a strainer, which consists of a metal frame 20 and a wire-gauze 21, said frame having a straight lower edge adapted to abut against the partition and being arranged in an inclined position within the neck, so that as the milk strikes the strainer in a stream it will be broken up and thoroughly aerated before passing through the screen, and any foreign matter coming in contact with the screen will roll or slide down the same into the trap or basin 9, which is designed to receive it. The strainer is held in its inclined position by studs or pins 22, which project inwardly from the neck at a point below the studs 15, and when the shield is removed the strainer may be withdrawn from the neck.

In use the milk from the cow strikes in a stream the inclined strainer, the upper edge of which engages the under side of the shield and the sides of which engage the opposite walls of the neck and the lower straight edge of which engages the partition of the neck, thus forming a joint which will prevent the escape of the milk around the edges of the strainer, thereby causing all of the milk to pass through the strainer, and after passing through the inclined strainer 19 it passes in succession through the strainers 10 and 5 into the body of the pail, and as the pail fills the air therein is forced outwardly through the screen-cover vent 23, formed in the top or cover.

The parts are all readily removable, thus enabling them to be kept in a perfectly sanitary condition.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

The combination with a pail-top provided with an opening and with a neck surrounding said opening, a partition extending across the top to form a trap or basin, and two sets of studs, one set being arranged in a plane above the other and each set projecting inwardly from the sides of the neck, of a strainer, the lower end of which fits upon the top and abuts against the partition, and the sides of which engage one set of studs to hold the strainer in an inclined position, a shield covering a portion of the neck and extending over the strainer and having notches to engage one set of studs, and a hook and staple for connecting the opposite edge of the strainer to the neck, substantially as set forth.

In testimony whereof I have hereunto set my hand in presence of two subscribing witnesses.

JOHN GRIFFIN.

Witnesses:
CHARLES W. JONES,
FRANCES E. GRIFFIN.